United States Patent
Hansen et al.

(10) Patent No.: US 6,666,482 B2
(45) Date of Patent: Dec. 23, 2003

(54) LOCKING ARRANGEMENT FOR A MOVABLE SECTION OF A VEHICLE ROOF

(75) Inventors: Klaus Peter Hansen, Lüneburg (DE); Thorsten Schumacher, Kummerfeld (DE)

(73) Assignee: CTS Fahrzeug-Dachsysteme GmbH, Hamburg (DE)

(*) Notice: Subject to any disclaimer, the term of this patent is extended or adjusted under 35 U.S.C. 154(b) by 0 days.

(21) Appl. No.: 10/136,630

(22) Filed: Apr. 25, 2002

(65) Prior Publication Data

US 2002/0163202 A1 Nov. 7, 2002

(30) Foreign Application Priority Data

May 6, 2001 (DE) .......................... 101 21 858

(51) Int. Cl.$^7$ ................................ E05C 7/00
(52) U.S. Cl. ..................... 292/24; 292/201; 296/107
(58) Field of Search .................... 292/216, 201, 292/DIG. 5, 341.16, 24, 25, 28, 44; 296/107, 121

(56) References Cited

U.S. PATENT DOCUMENTS

| | | | | |
|---|---|---|---|---|
| 3,425,742 A | * | 2/1969 | Rauber | 296/121 |
| 3,858,920 A | * | 1/1975 | Erickson | 292/302 |
| 4,468,063 A | * | 8/1984 | Yukmoto | 296/223 |
| 4,664,436 A | * | 5/1987 | Eyb | 296/121 |
| 4,749,193 A | * | 6/1988 | Hacker | 296/107 |
| 4,796,932 A | * | 1/1989 | Tame | 292/112 |
| 4,806,712 A | * | 2/1989 | Hoffman | 200/61.62 |
| 4,835,449 A | * | 5/1989 | Huehn | 318/282 |
| 5,301,987 A | * | 4/1994 | Tokarz | 292/39 |
| 5,624,149 A | * | 4/1997 | Tokarz | 296/121 |
| 5,639,130 A | * | 6/1997 | Rogers | 292/216 |
| 6,033,009 A | * | 3/2000 | Ritter | 296/121 |
| 6,419,297 B2 | * | 7/2002 | Haberi | 296/121 |
| 6,454,344 B2 | * | 9/2002 | Okada | 296/121 |

FOREIGN PATENT DOCUMENTS

| | | |
|---|---|---|
| DE | 198 01 852 | 7/1999 |
| DE | 199 27 236 | 10/2000 |
| DE | 200 16 292 | 12/2000 |
| DE | 199 44 615 | 4/2001 |
| EP | 0 657 607 | 6/1995 |

\* cited by examiner

Primary Examiner—Gary Estremsky
(74) Attorney, Agent, or Firm—Klaus J. Bach

(57) ABSTRACT

In a locking arrangement for a vehicle roof section movable between closed and open positions including a locking hook adjustable between a roof section release position and a locking position in which the locking hook is received in a locking receiver, a first sensor is provided for detecting the position of the locking hook before locking to ensure that it is properly positioned for insertion into the locking receiver, a second sensor is provided for detecting the engagement of the locking hook in the locking receiver and a third sensor is provided for detecting the locking of the locking hook in the locking receiver to ensure proper operation and locking of the locking arrangement.

9 Claims, 8 Drawing Sheets

LOCKING ARRANGEMENT FOR A MOVABLE SECTION OF A VEHICLE ROOF

BACKGROUND OF THE INVENTION

The invention relates to a locking arrangement for a movable section of a vehicle roof including at least one locking hook which is adjustable between a locking position and a release position and which, in the locking position, is received in a lock structure provided with a sensor for detecting the locked state of the roof section.

Such a locking arrangement is known for example from DE 198 01 852 A1. The locking arrangement is adjustable between a locking position in which the vehicle roof is connected to the windshield frame and a release position in which the roof is movable to an open or storage position. In the locking position, a locking hook of the locking arrangement extends into a respective recess and is locked therein in order to prevent an unintended release of the roof section, particularly when the vehicle is in motion.

For sensing the locking state of the locking hook during opening and closing of the roof, a contact-free reed sensor is arranged at a locking recess which sensor includes a magnet which produces a signal during the locking procedure when the locking hook enters the locking recess. The signal may be utilized for pulling the locking hook completely into the locking recess and into its final locking position.

For an automatic opening and closing of the roof, it is very important to determine the correct functioning of the locking hook and particularly also the momentary position of the locking hook in the locking recess. It is therefore considered to be important to employ sensitive sensors for determining the locking state of the locking arrangement.

DE 199 27 236 C1 also discloses a locking mechanism for a movable roof section with a locking hook which is movable between a locking position and a release position wherein the locking hook extends into a locking recess for locking the roof section. By way of a micro-switch arranged on the locking mechanism which assumes the function of a sensor or, alternatively, by way of an inductive sensor, the engagement of the locking hook with a locking receiver can be determined whereupon an electric control causes an electric motor to pull the locking hook fully into a closed position.

Furthermore, the locking of the locking hook can be determined by means of a position recognition arrangement. In this way, using two sensors two locking states of the locking movement can be determined.

DE 199 44 615 A1 discloses a lock for a pivotable vehicle roof with a locking hook which, in the locking position engages a shackle. Upon closing of the roof, a sensor provides a signal when the roof has reached a certain position. The sensor therefore determines the movement of the roof but not the locking state of the locking mechanism. The roof movement and the locking movement are different movement procedures, which are separately controlled so that from the determination of the momentary roof position only the moment when the locking action is initiated can be determined, but not the locking condition.

It is the object of the present invention to provide a locking arrangement with two diametrically opposite locking hooks wherein the momentary locking condition can be easily detected with high precision and, at the same, time faulty operation of the locking mechanism can be detected.

SUMMARY OF THE INVENTION

In a locking arrangement for a vehicle roof section movable between closed and open positions including a locking hook adjustable between a roof section release position and a locking position in which the locking hook is received in a locking receiver, a first sensor is provided for detecting the position of the locking hook before locking to ensure that it is properly positioned for insertion into the locking receiver, a second sensor is provided for detecting the engagement of the locking hook in the locking receiver and a third sensor is provided for detecting the locking of the locking hook in the locking receiver to ensure proper locking of the locking arrangement.

The first sensor can determine whether the locking hook is in a position from which an insertion into the locking recess is possible. With the second sensor, it can be determined whether the locking hook has actually been inserted into the locking recess and is not accidentally moved to its latching position outside the locking recess. With the third sensor, it can be determined whether the locking arrangement is locked in the latching position so as to prevent an inadvertent release when the vehicle is in motion. The sensors are preferably contact-free sensors, particularly Hall sensors.

An embodiment of the invention will be described below on the basis of the accompanying drawings.

DESCRIPTION OF A PREFERRED EMBODIMENT

In the following figures, identical components are designated by the same reference numerals.

Figure 1:
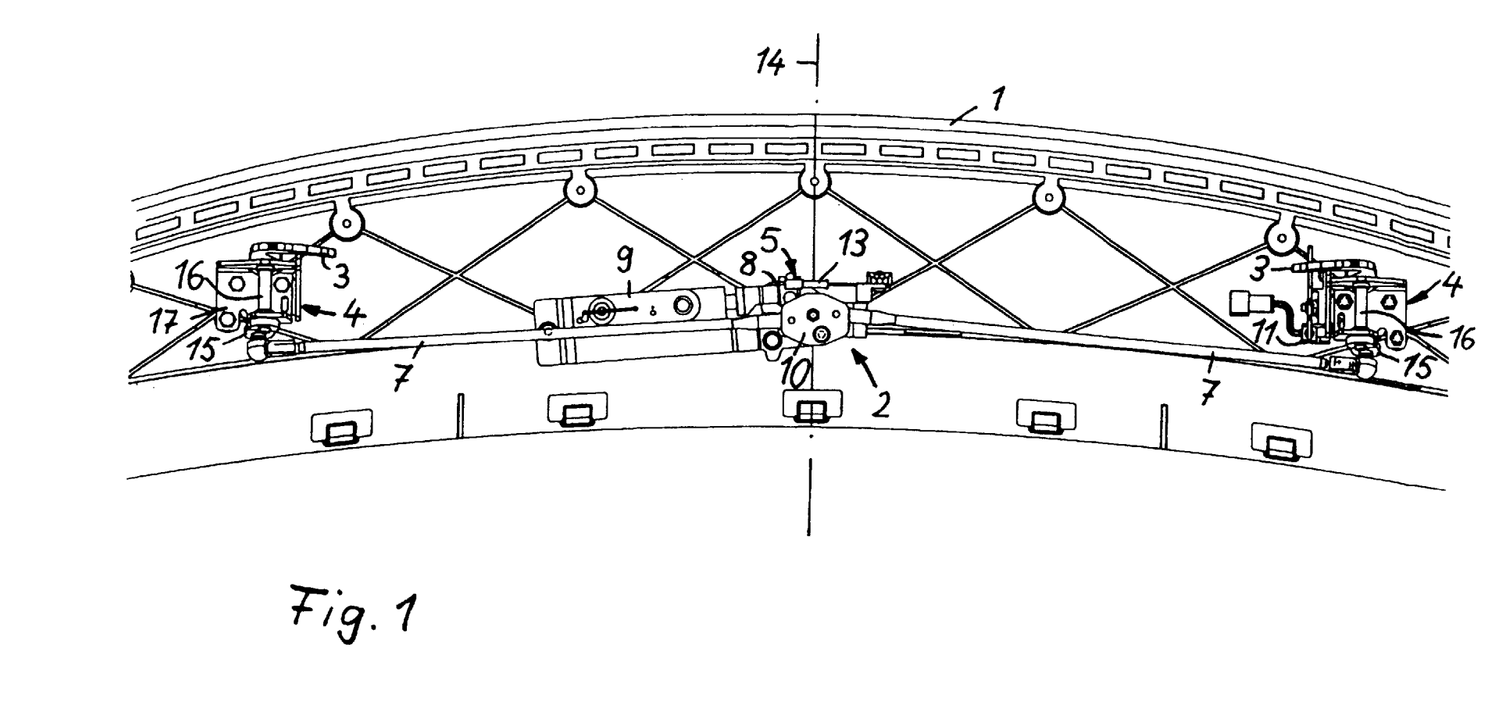
FIG. 1 shows a movable roof section in a vehicle roof with a locking arrangement including two locking hooks, which are operated by drive arms from a central actuator between a release position and a locking position.

FIG. 1 shows the bottom side of a movable vehicle roof section, which is movable between a closed position and an open cabriolet position, in which the vehicle interior is open. In order to lock the vehicle roof in its closed position to the windshield frame or another roof section which is a part of the vehicle body, there is at the lower side of the movable roof section 1 at the front end adjacent the windshield frame, a locking arrangement 2, which is adjustable between a release position and a locking position. In the release position, the roof section can be transferred to its storage position and in the locking position, the roof section is locked to the windshield frame or, respectively, another roof part, which is connected to the vehicle body.

Figure 7:
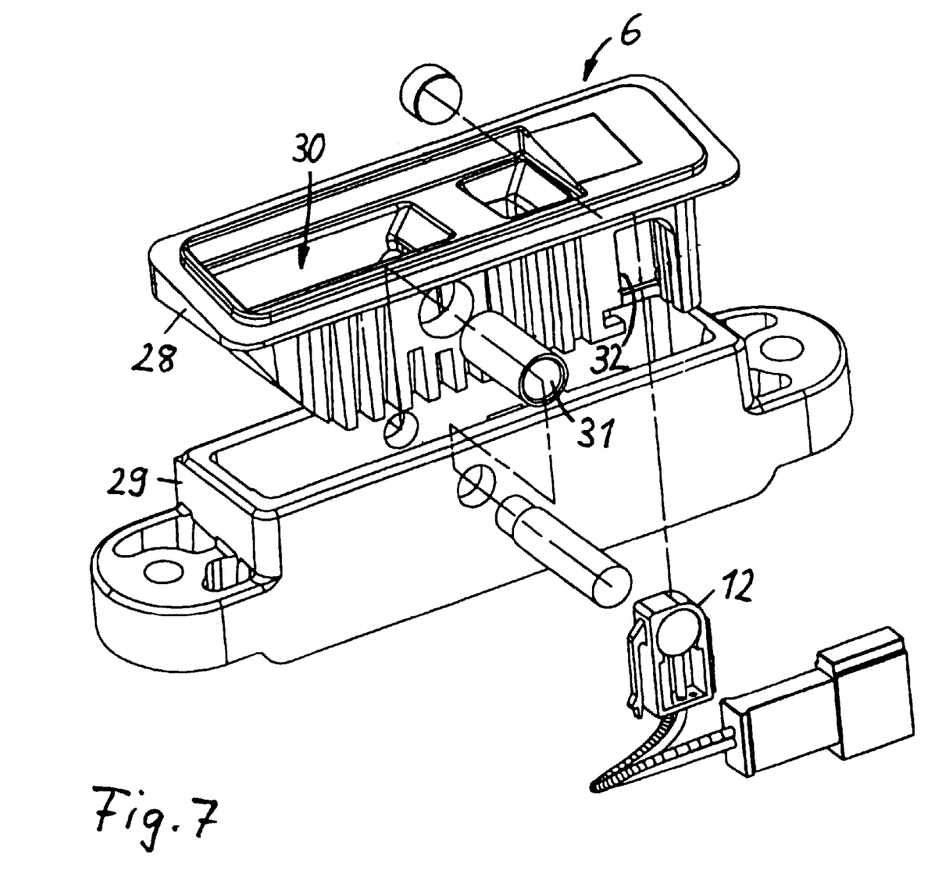
FIG. 7 is a perspective view of a lock receiver into which the locking hook extends in a locked position.
Figure 8:
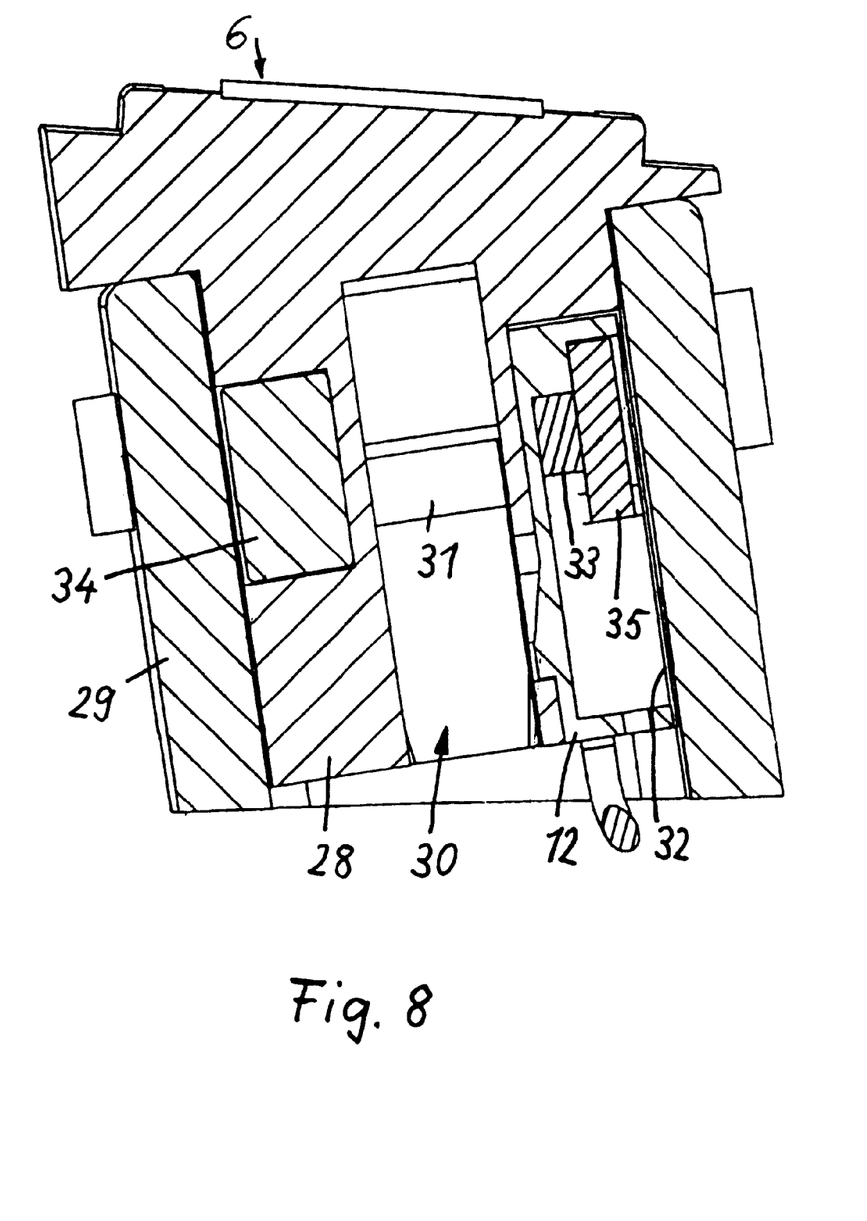
FIG. 8 is a cross-sectional view of the lock receiver showing a Hall sensor.

The locking arrangement 2 at the underside of the roof section 1 comprises two locking hooks 3 arranged, in a mirror reversed fashion, in the respective side areas of the roof section 1 and which are supported on the roof section 1 so as to be pivotable by a hook operating mechanism 4 whereby they are movable by a drive structure 5 automatically between a release position and a locking position. In the locking position, the locking hooks 3 extend into a locking receiver 6 as shown in FIGS. 7 and 8, which is also part of the locking arrangement.

Figure 2:
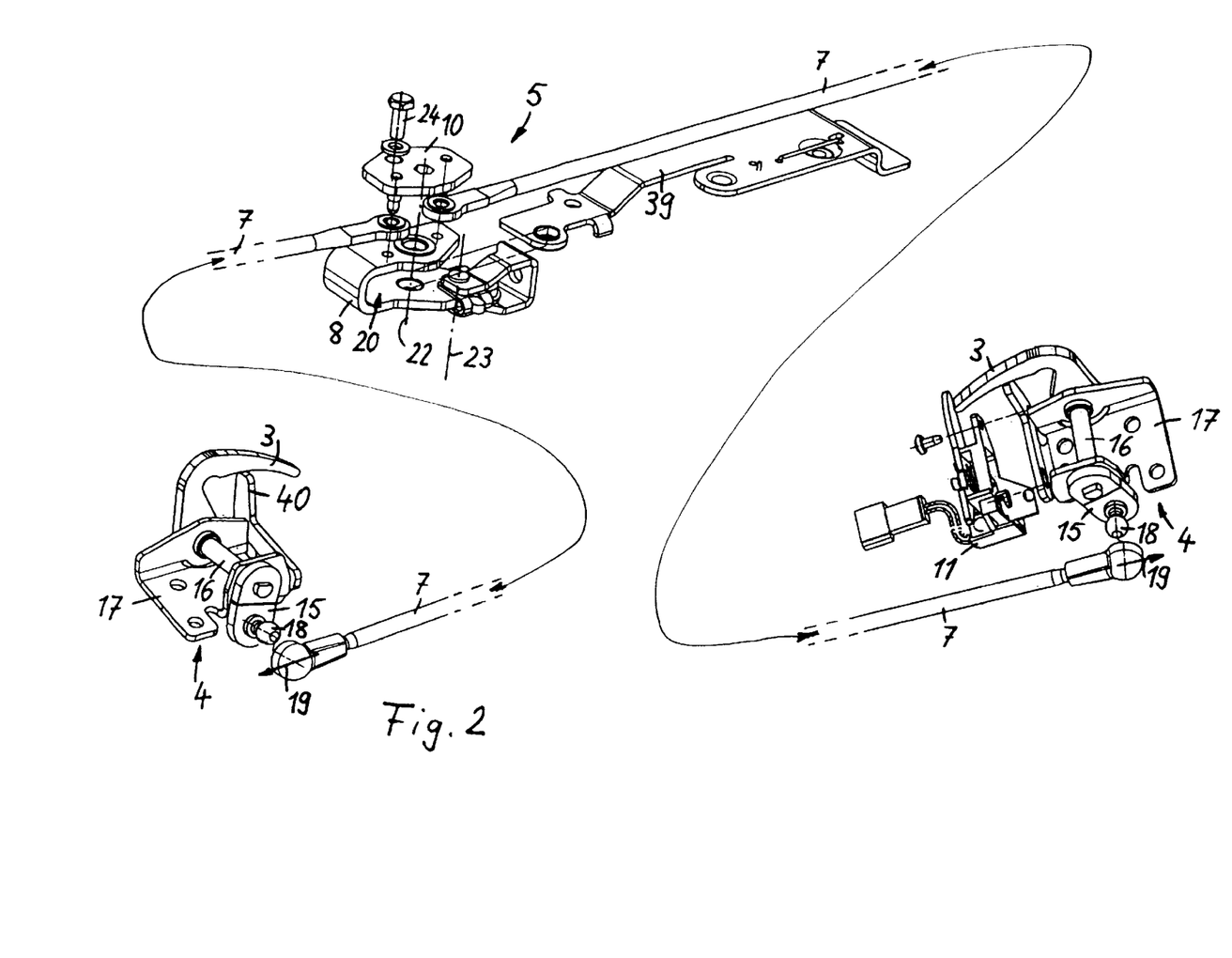
FIG. 2 is a perspective view of the two locking hooks including the central drive.

As shown in FIGS. 1, 2, the drive structure 5 comprises a drive arm 8 which is pivotally supported on the roof section 1 so as to be rotatable about a vertical axis which extends normal to the longitudinal vehicle axis. The drive structure 5 further comprises an actuator 9, which is preferably a hydraulically operable control member connected to the drive arm 8 for pivoting the drive arm 8 about its vertical pivot axis. The drive structure 5 further includes a drive linkage consisting of an operating rod 7, which is linked at one end to the drive arm 8 and at the other end to a lever 15, which is connected to the pivot shaft 16 of the locking hook 3 so that a linear movement of the operating rod 7 results in a pivot movement of the locking hook 3. The pivot shaft 16 of the locking hook 3 extends parallel to the longitudinal vehicle axis 14. The actuator 9 extends transverse to the longitudinal axis 14 and is disposed asymmetrically in one of the roof section halves.

FIG. 1 shows the locking hooks 3 in the locking position. In this position, the longitudinal axes of the two operating rods are essentially aligned and intersect the pivot axis of the drive arm 8.

The drive structure 5 is further provided with a sensor 13, by which particularly the locking position ("locked") of the locking arrangement can be detected. Another sensor 11 is arranged in the area of the operating mechanism 4 of the locking hook 3. By way of the sensor 11, it can be determined whether the locking hook, during transfer into its locking position, is in a ready position ("ready to latch") from which the locking hook can be inserted into the respective locking receiver 6. The sensor 11 is to determine whether the locking hook can be pivoted in the predetermined manner.

Expediently, a sensor 11 is provided only at one side of the two locking hooks. Because each locking hook is kinematically coupled, by way of the locking hook operating mechanism and the respective operating rods 7, to the drive arm 8, basically a single sensor is sufficient to determine whether the two locking hooks are pivotable.

It may however be advantageous to provide a sensor for each locking hook in order to make it possible to detect the pivotability of each locking hook independently of the opposite locking hook.

As apparent from FIG. 1 in connection with the enlarged representation of FIG. 2, the lock operating mechanism 4 includes a hook support member 17 by way of which the hook operating mechanism is screwed to the movable roof section 1 and which supports the pivot shaft 16 of the locking hook 3. It is also shown in FIG. 2 that the lever 15, which is connected to the pivot shaft 16, is connected to the operating rod 7 by way of a ball joint 18. The ball joint 18 is arranged at the end of the lever 15 remote from the pivot shaft 16 and extends, with respect to the pivot shaft 16, in a direction opposite to the locking hook 3, so that a linear movement of the operating rod 7 in the operating direction 19 causes pivoting of the locking hook into its locking position. Vice versa, the locking hook 3 is pivoted out of its locking position to its release position when the operating rod 7 is pulled in a direction opposite to the direction 19. FIG. 2 shows a crash pin 40, which limits the pivot movement of the locking hook 3 particularly during a crash.

The free ends of the two locking hooks point toward the centrally arranged drive arm 8.

Figure 3:
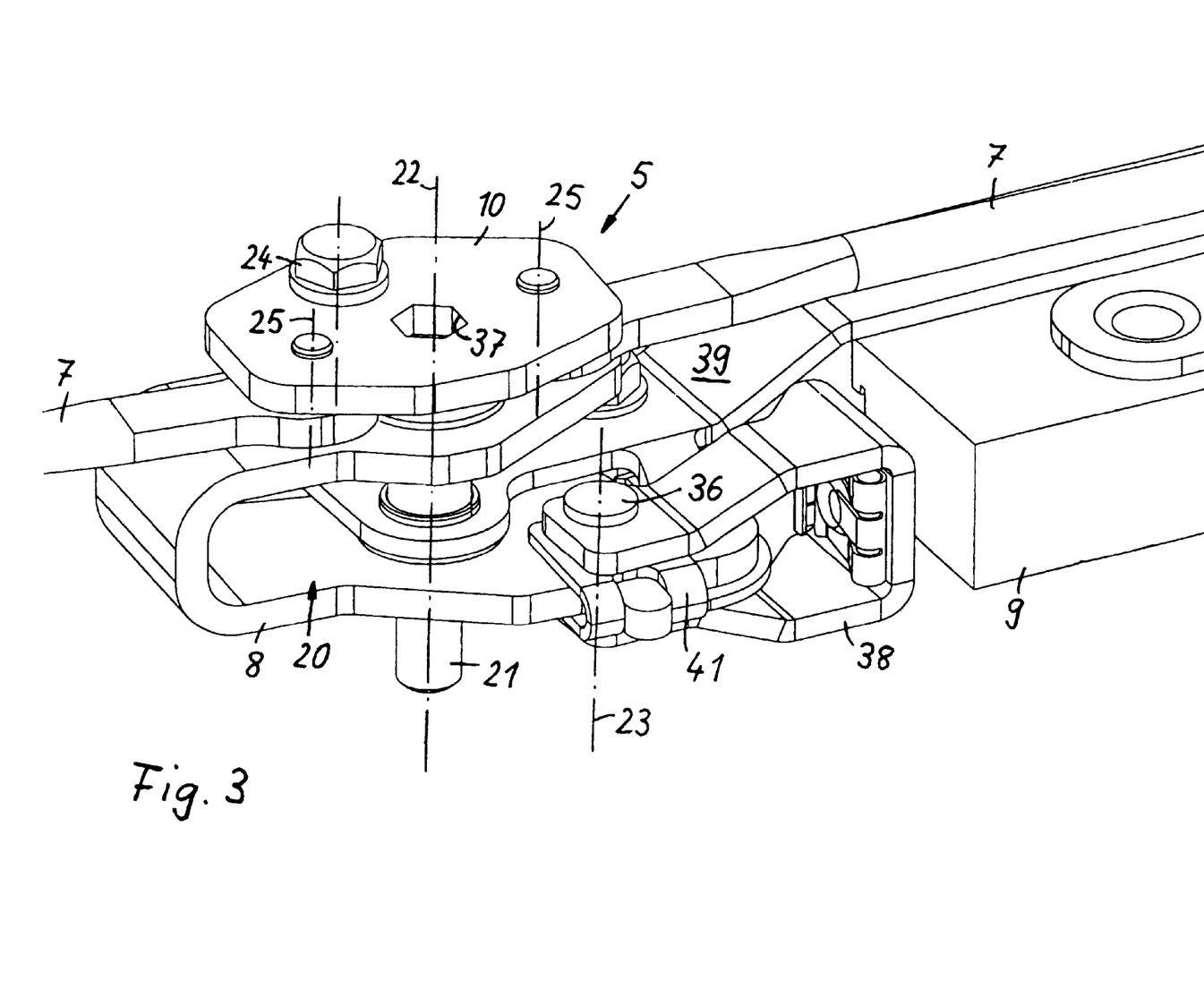
FIG. 3 is an enlarged perspective view of the central actuator.

FIG. 2 and the enlarged representation according to FIG. 3 show the locking arrangement in a dead center, or aligned, position between the release and the locking positions. The drive arm 8 is U-shaped and pivotally connected, by way of a joint bolt 36 having a pivot axis 23, to a U-shaped forked end flange 38 of the actuator 9. Into the space 20 between the two legs of the actuator 8 extends a mounting web 39, which is firmly connected to the roof section 1 and on which the drive arm 8 is rotatably supported.

The pivot bolt 21 extends through bores in the legs of the drive arm 8 and defines a pivot axis 22, which is disposed in spaced parallel relationship from the pivot axis 23 of the end flange 38 of the actuator 9 at the drive arm 8.

A cover plate 10 is mounted on the drive arm 8 by a mounting screw 24, the two operating rods 7 being disposed between the cover plate 10 and the drive arm 8. The two operating rods 7 are also linked to the drive arm 8 and, respectively, the cover plate 10. The respective joint axes 25 of the two operating rods 7 are disposed at a distance from the pivot axis 22 of the drive arm on the roof section and also at a distance from the pivot axis 23 of the actuator 9 on the drive arm 8.

The cover plate 10 includes a multi-edge recess 37 (socket head) which is disposed co-axially with the pivot axis 22 and into which a respective fitting tool (socket wrench) can be inserted for a manual operation of the locking mechanism.

Figure 4:
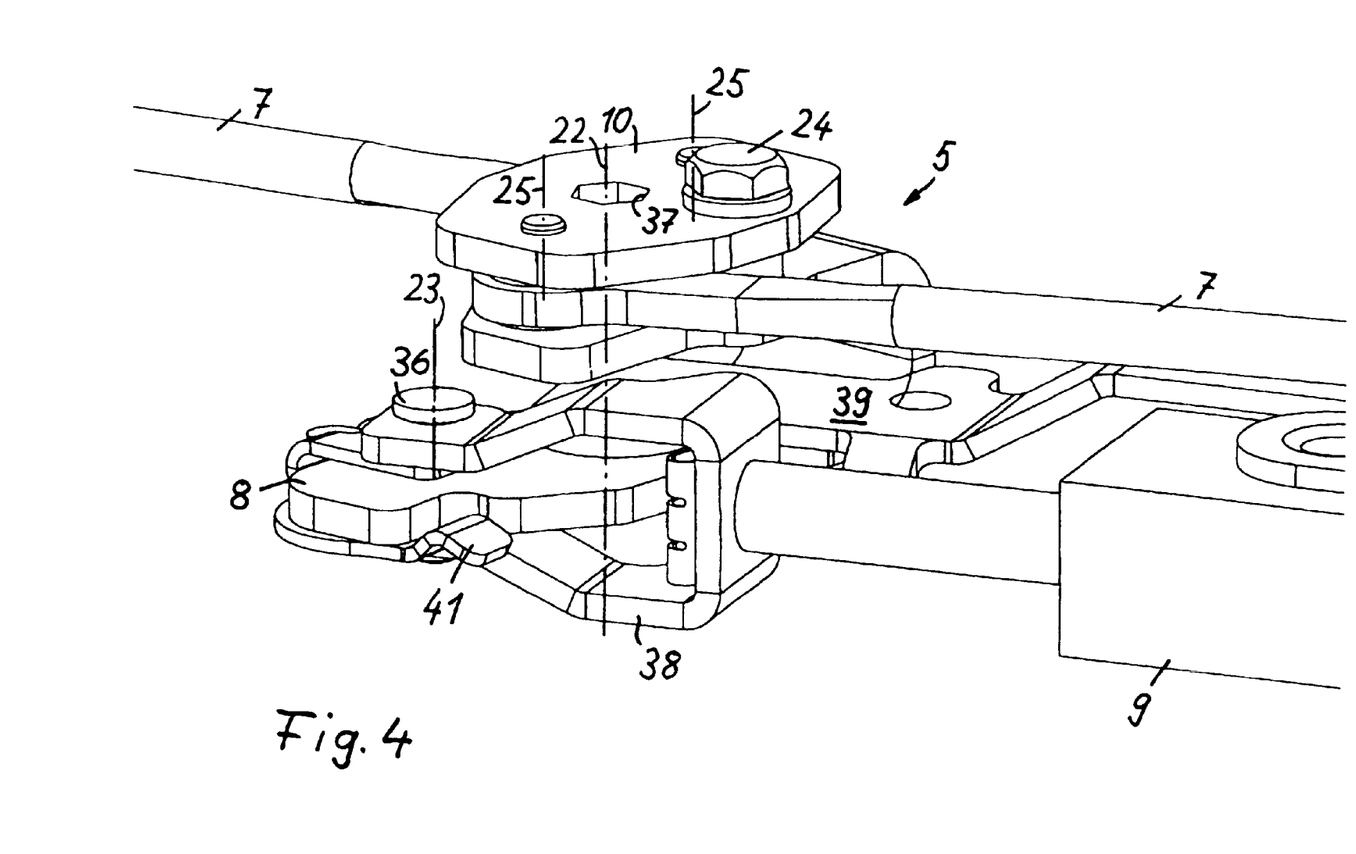
FIG. 4 is a view like that of FIG. 3, but from another perspective.
Figure 5:
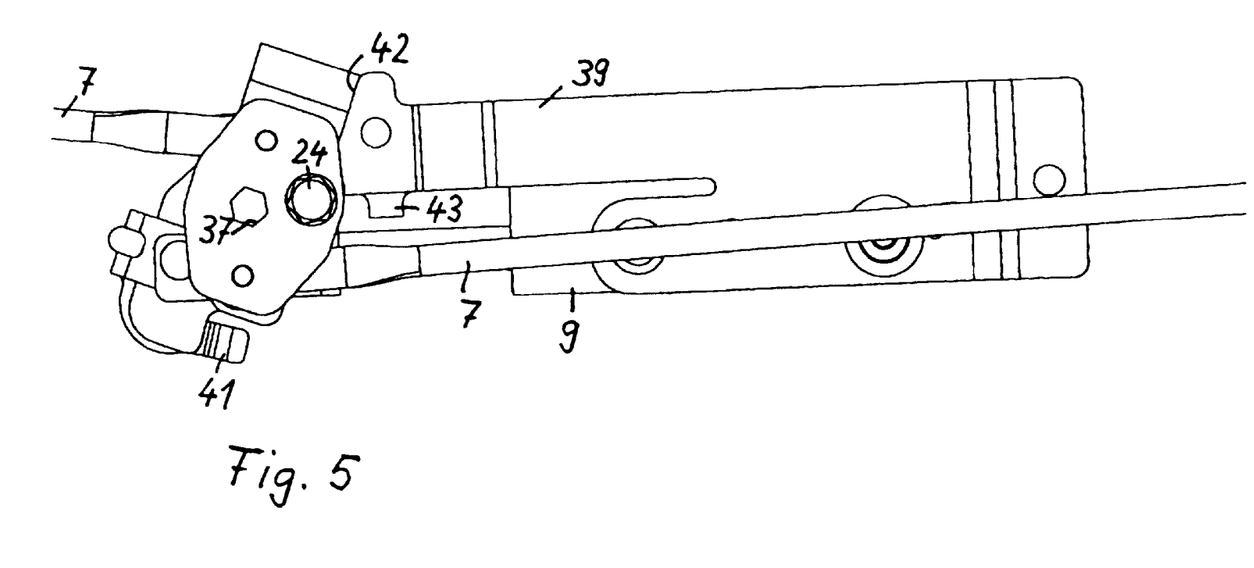
FIG. 5 is a top view of the drive for the central actuator and the locking hooks.

FIGS. 4 and 5 show two representation of the locking arrangement in the release position, in which the vehicle roof can be opened. For securing the locking arrangement in the locking position, a secondary locking structure is provided which is to prevent an unintended release of the roof locking mechanism during normal operation of the vehicle when the vehicle is subjected to jolts that are transferred from the street to the vehicle and also during a crash.

The secondary locking mechanism is formed in the embodiment shown by a spring clamp 4, which exerts a clamping force on a component that is kinematically coupled with the locking hook 3, particularly the drive arm 8, when the vehicle roof section is locked in its closed position. The clamping spring 41 is held by the forked end flange 38 of the drive arm 8.

FIG. 1 shows furthermore two stops 42 and 43, which are formed on the mounting web 39 and which delimit the release movement (stop 42) and the locking movement (stop 43). In the end position, a pivotable component of the locking mechanism abuts the stops 42 and 43, particularly the drive arm 8 or, respectively, a part firmly connected thereto.

Figure 6A:
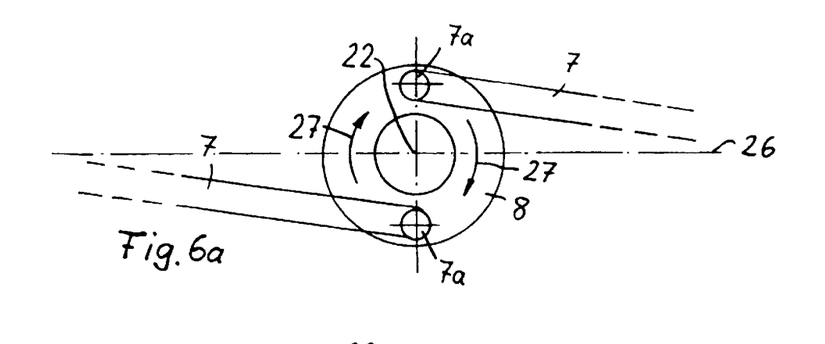
FIGS. 6a to 6c show schematically the locking hook drive arrangement in a release position (FIG. 6a) in an extended position (FIG. 6b) and in a locking position (FIG. 6c)
Figure 6B:
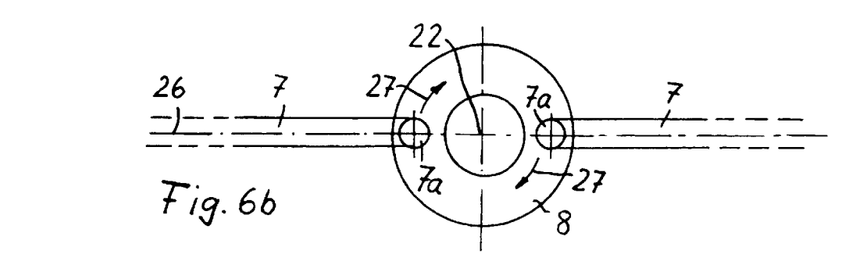
Figure 6C:
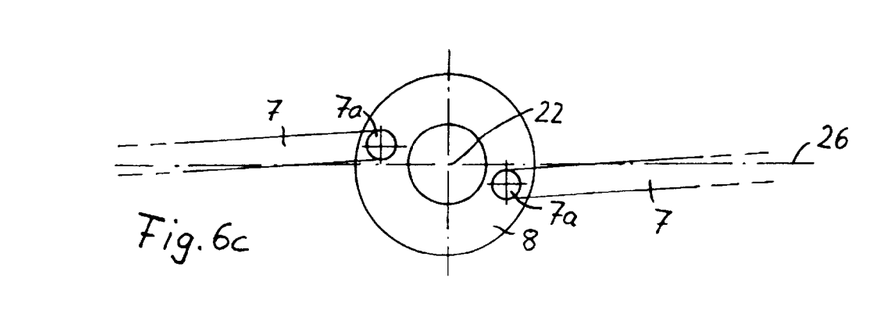

FIGS. 6a–6c show schematically the locking movement of the drive arm 8 as it is transmitted to the operating rods 7. In FIG. 6a, the drive arm 8 and the operating rods are shown in the release position. In this position, the connecting points 7a of the operating rods 7 at the drive arm 8 are disposed at their maximum radial distance from the connecting line 26 between the pivot axis 22 of the drive arm 8 and the connecting point of each operating rod 7 with the lever 15 of the respective locking hook 3 (see FIG. 2). Upon movement of the drive arm 8 from the release position shown in FIG. 6a in the pivot direction indicated by the arrow 27 toward the locking position, the connecting points 7a of the operating rods 7 are pivoted by about 90° toward the respective locking hooks to the position shown in FIG. 6b. In this position the connecting points 7a and the longitudinal axis of the operating rods coincide with the connecting line 26 between the pivot axis 22 and the connecting points 26 of the operating rods at the lever of the locking hook. With a further pivoting of the drive arm 8 by a small angle in the direction of the arrow 27 beyond the dead center position as shown in FIG. 6b to a position slightly beyond the dead center position as shown in FIG. 6c the final locking position of the locking hooks 4 is reached.

FIG. 7 shows the locking receiver 6 into which the locking hook 3 extends in the locking position. The locking receiver 6 is mounted on a component opposite the locking hook. If the locking hook is mounted to the movable roof section, the locking receiver 6 is mounted to a vehicle body part, specifically to the upper area of the windshield frame or a transverse roof member connected to the vehicle body. Correspondingly, the arrangement is reversed if the locking hook is mounted on a part of the vehicle body such as a stationary roof part or the windshield frame.

The locking receiver 6 comprises an insert 28, which is to be inserted into a housing 29. The insert 28 includes a recess 30, which is divided into two sections by a roller 31 supported so as to extend across the recess 30. In the locking position, the locking hook 3 extends into the recess 30 behind the roller 31 whereby the locking hook is engaged in the recess in a form-locking manner. The roof is pulled into final closing position during the locking procedure by the hook having a shape to pull the roof tightly against the stationary part that is the windshield frame.

At the locking receiver, there is a second sensor 12, which detects the latching of the locking hook with the locking receiver. The sensor 12 may be inserted into an opening 32 in the insert 28 wherein it is engaged.

The second sensor 12 arranged in the locking receiver 6 may be a Hall sensor. Also, the sensor 11 and 13 (see FIG. 1), which are used for detecting the ready position of the locking hook 3 and for detecting the locking of the locking hook in the locking receiver may be Hall sensors. The use of Hall sensors has the advantage that the respective state to be determined can be sensed in a contact-free manner.

As shown in FIG. 8, the sensor 12 disposed in the opening 32 of the locking receiver 6 comprises a sensor element 33 in the form of a Hall sensor, which is disposed immediately adjacent the recess 30, into which the locking hook extends when it is in the locking position. It is then separated from the opening 32 only by a thin housing wall. On the side of the recess 30 diametrically opposite the opening 32, a permanent magnet 34 is arranged which, like the sensor element 33, is separated from the recess 30 receiving the locking hook only by a thin wall consisting of a material which is transparent to magnetic field lines.

When the locking hook is inserted into the recess 30 for locking the roof and moves, in the process, through the magnetic field generated by the permanent magnet 34, a Hall voltage is generated in the sensor element 33, which is supplied as a sensor signal—like the signals of the other sensors—to a control unit for further processing. Upon proper operation of the sensors as indicated by the evaluation of the sensor signals, a control signal is generated by which the actuator for the locking and release of the locking hook is controlled. Upon failure, an alarm signal can be generated.

In an advantageous embodiment, a ferromagnetic plate 35 is arranged at the backside of the sensor element 33 remote from the permanent magnet 34. The plate 35 broadens the effective sensitive range of the Hall sensor by concentrating the magnetic field lines of the permanent magnet 34 between the permanent magnet 34 and the ferromagnetic plates 35. Expediently, the ferromagnetic plate 35 has about the same face area as the permanent magnet 34 and is arranged at the same level of, and parallel to, the magnet 34.

The ferromagnetic plate 35 preferably is a part of the sensor 12 and is integrated into the sensor housing together with the sensor element. Also, the other sensors may be constructed in the same way with an addition of a ferromagnetic plate arranged behind the sensor element.

What is claimed is:

1. A locking arrangement for a vehicle roof section movable between a closed position and an open position including first and second locking hooks disposed at opposite sides of said vehicle roof section and a common operating mechanism for moving the locking hooks between a locking position and a release position, first and second locking receivers arranged opposite said respective first and second locking hooks for receiving said locking hooks in the closed position of said vehicle roof section, said locking arrangement including a first sensor mounted to said first locking receiver for detecting the position of said first locking hook before locking to determine whether it is in a proper position for insertion into said first locking receiver, a second sensor mounted to one of said first and second locking receivers for detecting the engagement of the respective one of said locking hooks in the respective locking receiver and a third sensor mounted to the other of said first and second locking receivers for detecting the locking of the other locking hook in the other locking receiver.

2. A locking arrangement according claim 1, wherein said first sensor for detecting the proper position of said locking hook for insertion into the first locking receiver is arranged at an operating mechanism for said first locking hook.

3. A locking arrangement according to claim 1, wherein said second sensor is mounted to the second locking receiver so as to detect the engagement of the second locking hook in the second locking receiver.

4. A locking arrangement according to claim 1, wherein said locking arrangement includes a drive structure and operating rods extending from said drive structure to said locking hooks and said third sensor for detecting the locking position of the respective locking hook in the respective locking receiver is arranged so as to sense the position of the movable drive rod to which the respective operating rod is connected.

5. A locking arrangement according to claim 3, wherein at least one of said sensors is a Hall sensor.

6. A locking arrangement according to claim 5, wherein each of said locking receivers includes a recess for receiving a locking hook and said Hall sensor is arranged at one side of said recess and a permanent magnet is arranged at the side of said recess opposite said Hall sensor for generating a magnetic field which is disturbed by the insertion of said locking hook into said recess so that the presence of said locking hook is sensed by said Hall detector.

7. A locking arrangement according to claim 4, wherein a ferromagnetic plate is arranged at the side of said magnet remote from said Hall sensor.

8. A locking arrangement according to claim 7, wherein all sensors consist of Hall sensors and have magnets associated therewith for generating a magnetic field sensed by the respective Hall sensors, and a ferromagnetic plate is arranged at the side of each magnet remote from the respective associated Hall sensor.

9. A locking arrangement according to claim 8, wherein each of said ferromagnetic plates has a surface area corresponding in size about to the surface area of the cooperating Hall sensor.

\* \* \* \* \*